United States Patent
Hagiwara

(10) Patent No.: US 9,513,466 B2
(45) Date of Patent: Dec. 6, 2016

(54) PHOTOGRAPHING LENS AND ELECTRONIC DEVICE

(71) Applicant: SAMSUNG ELECTRONICS CO., LTD., Suwon-si, Gyeonggi-do (KR)

(72) Inventor: Hiroyuki Hagiwara, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/706,290

(22) Filed: May 7, 2015

(65) Prior Publication Data

US 2015/0234152 A1 Aug. 20, 2015

Related U.S. Application Data

(63) Continuation of application No. 14/096,550, filed on Dec. 4, 2013, now Pat. No. 9,042,035.

(30) Foreign Application Priority Data

Dec. 4, 2012 (JP) .................................. 2012-265572
Jul. 9, 2013 (KR) ........................ 10-2013-0080353

(51) Int. Cl.
*G02B 13/18* (2006.01)
*G02B 9/60* (2006.01)
(Continued)

(52) U.S. Cl.
CPC ............ *G02B 13/0045* (2013.01); *G02B 1/041* (2013.01); *G02B 9/60* (2013.01); *G02B 13/0055* (2013.01); *G02B 27/0025* (2013.01)

(58) Field of Classification Search
CPC .............................. G02B 13/0045; G02B 9/60
(Continued)

(56) References Cited

U.S. PATENT DOCUMENTS

2011/0273611 A1* 11/2011 Matsusaka ......... G02B 13/0045
348/345
2011/0310287 A1* 12/2011 Ohtsu .................. H04N 5/2254
348/340

(Continued)

FOREIGN PATENT DOCUMENTS

JP 2009-294528 A 12/2009
JP 2010-262270 A 11/2010
(Continued)

*Primary Examiner* — William Choi
(74) *Attorney, Agent, or Firm* — Drinker Biddle & Reath LLP

(57) ABSTRACT

A photographing lens and an electronic device including the same are provided. The photographing lens includes a first lens, a second lens, a meniscus third lens, a meniscus fourth lens, and a fifth lens. The first lens has a positive refractive power and an object side lens surface that is convex toward the object side. The second lens has negative refractive power and an image side lens surface that is convex toward the image side. The meniscus third lens has a positive refractive power and an image side lens surface that is concave toward the image side. The meniscus fourth lens has a positive refractive power and an image side lens surface that is convex toward the image side. The fifth lens has a negative refractive power and an image side lens surface that is concave toward the image side around an optical axis.

20 Claims, 9 Drawing Sheets

(51) Int. Cl.
  *G02B 13/00* (2006.01)
  *G02B 27/00* (2006.01)
  *G02B 1/04* (2006.01)

(58) Field of Classification Search
  USPC .................................................. 359/714, 764
  See application file for complete search history.

(56) References Cited

U.S. PATENT DOCUMENTS

| | | |
|---|---|---|
| 2013/0088635 A1 | 4/2013 | Sano |
| 2013/0113976 A1* | 5/2013 | Shinohara .......... G02B 13/0045 348/333.01 |
| 2013/0169852 A1 | 7/2013 | Sano et al. |
| 2013/0176469 A1 | 7/2013 | Sano et al. |
| 2013/0279020 A1* | 10/2013 | Noda ..................... G02B 3/04 359/708 |

FOREIGN PATENT DOCUMENTS

| | | |
|---|---|---|
| JP | 2011-138175 A | 7/2011 |
| JP | 2012-008164 A | 1/2012 |
| JP | 2012-037763 A | 2/2012 |
| JP | 2012-073642 A | 4/2012 |
| JP | 2012-083776 A | 4/2012 |
| JP | 2012-098737 A | 5/2012 |
| JP | 2012-103717 A | 5/2012 |
| JP | 2012-113311 A | 6/2012 |
| WO | WO 2010/024198 A1 | 3/2010 |

\* cited by examiner

PHOTOGRAPHING LENS AND ELECTRONIC DEVICE

CROSS-REFERENCE TO RELATED PATENT APPLICATIONS

This application is a continuation of U.S. patent application Ser. No. 14/096,550, filed Dec. 4, 2013, which claims the priority benefit of Japanese Patent Application No. 2012-265572, filed on Dec. 4, 2012, in the Japanese Patent Office and Korean Patent Application No. 10-2013-0080353, filed on Jul. 9, 2013, in the Korean Intellectual Property Office, the disclosures of which are incorporated herein in their entireties by reference.

BACKGROUND

1. Field

One or more embodiments of the invention relate to a small photographing lens and an electronic device including the same.

2. Description of the Related Art

In recent years, photographing devices using a solid-state imaging device, such as a charge-coupled device (CCD)-type image sensor or a complementary metal-oxide semiconductor (CMOS)-type image sensor, have been widely used. Examples of such photographing devices include a digital still camera, a video camera, an exchangeable lens camera, and the like. In addition, since the photographing devices using a solid-state imaging device are suitable for miniaturization, the photographing devices have been recently used not only in mobile phones but also in small personal digital assistants (PDAs). Users demand photographing devices with a high performance, such as high resolution and wide angles. In addition, the consumers' knowledge on cameras has consistently increased.

Furthermore, miniaturization and high pixelation of imaging devices are being developed. Accordingly, there is a demand for high resolution and high performance photographing lenses. However, a fast lens with an F-number of 2.8 or more has been realized, but the fast lens is not likely to obtain a sufficient optical performance due to diffraction.

SUMMARY

One or more embodiments include a photographing lens that is small and has a high image forming performance.

One or more embodiments include an electronic device including a photographing lens that is small and has a high image forming performance.

Additional aspects will be set forth in part in the description which follows and, in part, will become apparent from the description, or may be learned by practice of the presented embodiments.

According to one or more embodiments, a photographing lens includes, sequentially from an object side to an image side: a first lens having a positive refractive power and an object side lens surface that is convex toward the object side; a second lens having a negative refractive power and an image side surface that is convex toward the image side; a meniscus third lens having a positive refractive power and an image side lens surface that is concave toward the image side; a meniscus fourth lens having a positive refractive power and an image side lens surface that is convex toward the image side; and a fifth lens having a negative refractive power and an image side surface that is concave toward the image side around an optical axis. The photographing lens satisfies the following expressions:

$$-3.0<(r21+r22)/(r21-r22)<-1.0, \text{ and}$$

$$-10.0<(r31+r32)/(r31-r32)<-1.5.$$

where, "r21" denotes a paraxial radius of curvature of the object side lens surface of the second lens, "r22" denotes a paraxial radius of curvature of the image side lens surface of the second lens, "r31" denotes a paraxial radius of curvature of the object side lens surface of the third lens, and "r32" denotes a paraxial radius of curvature of the image side lens surface of the third lens.

The first lens and the second lens may satisfy the following expressions:

$$0.75<f1/f<1.4, \text{ and}$$

$$-2.0<f2/f<-0.7,$$

where, "f" denotes a focal length of the photographing lens, "f1" denotes a focal length of the first lens, and "f2" denotes a focal length of the second lens.

The third lens and the fourth lens may satisfy the following expressions:

$$1.2<f3/f<3.8, \text{ and}$$

$$0.4<f4/f<1.0,$$

where, "f" denotes a focal length of the photographing lens, "f3" denotes a focal length of the third lens, and "f4" denotes a focal length of the fourth lens.

The fifth lens may satisfy the following expression:

$$-0.85<f5/f<-0.3,$$

where, "f" denotes a focal length of the photographing lens, and "f5" denotes a focal length of the fifth lens.

The fifth lens may have a biconcave shape around the optical axis.

The image side lens surface of the second lens may have no inflection point.

The image side lens surface of the fifth lens may have at least one inflection point that is not an intersection point between the fifth lens and the optical axis.

The first lens, the third lens, the fourth lens, and the fifth lens may be formed of the same material.

The photographing lens may satisfy the following expression:

$$vd1345>50.0,$$

where, "vd1345" denotes an Abbe's number with respect to a d-line of the first lens, the third lens, the fourth lens, and the fifth lens.

The photographing lens may satisfy the following expression:

$$vd2<25.0,$$

where, "vd2" denotes an Abbe's number with respect to a d-line of the second lens.

The photographing lens may satisfy the following expression:

$$D34t<D3t,$$

where, "D34t" denotes an air-gap on the optical axis between the third lens and the fourth lens, and "D3t" denotes a thickness of the third lens on the optical axis.

The photographing lens may satisfy the following expression:

$$1.0<(r41+r42)/(r41-r42)<3.0,$$

where, "r41" denotes a paraxial radius of curvature of the object side lens surface of the fourth lens, and "r42" denotes a paraxial radius of curvature of the image side lens surface of the fourth lens.

The photographing lens may satisfy the following expression:

$$-0.8 < (r51+r52)/(r51-r52) < 3.0,$$

where, "r51" denotes a paraxial radius of curvature of the object side lens surface of the fifth lens, and "r52" denotes a paraxial radius of curvature of the image side lens surface of the fifth lens.

According to one or more embodiments, an electronic device includes a photographing lens, and an imaging element that receives an optical image formed by the photographing lens and converts the optical image into an electrical image signal. The photographing lens includes, sequentially from an object side to an image side: a first lens having a positive refractive power and an object side lens surface that is convex toward the object side; a second lens having a negative refractive power and an image side surface that is convex toward the image side; a meniscus third lens having a positive refractive power and an image side lens surface that is concave toward the image side; a meniscus fourth lens having a positive refractive power and an image side lens surface that is convex toward the image side; and a fifth lens having a negative refractive power and an image side surface that is concave toward the image side around an optical axis. The photographing lens satisfies the following expressions:

$$-3.0 < (r21+r22)/(r21-r22) < -1.0, \text{ and}$$

$$-10.0 < (r31+r32)/(r31-r32) < -1.5,$$

where, "r21" denotes a paraxial radius of curvature of the object side lens surface of the second lens, "r22" denotes a paraxial radius of curvature of the image side lens surface of the second lens, "r31" denotes a paraxial radius of curvature of the object side lens surface of the third lens, and "r32" denotes a paraxial radius of curvature of the image side lens surface of the third lens.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Hereinafter, a photographing lens according to an embodiment and an electronic device including the photographing lens will be described in detail with reference to the accompanying drawings. Expressions such as "at least one of," when preceding a list of elements, modify the entire list of elements and do not modify the individual elements of the list.

Figure 1:
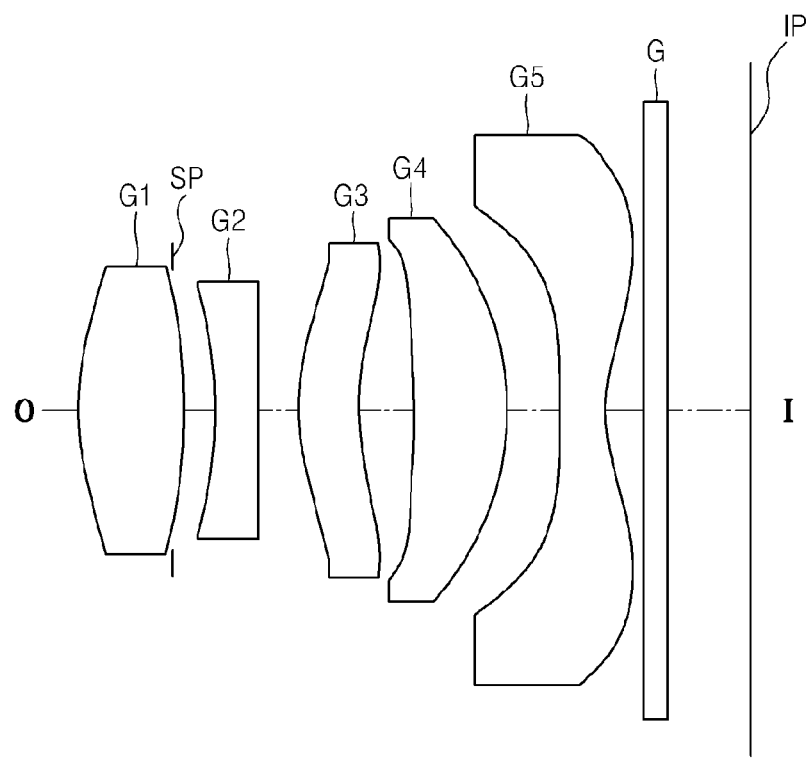
FIG. 1 is a diagram illustrating a photographing lens, according to an embodiment.

FIG. 1 is a diagram illustrating a photographing lens, according to an embodiment. The photographing lens includes a first lens G1, a second lens G2, a third lens G3, a fourth lens G4, a fifth lens G5, which are sequentially arranged in a direction from an object side O to an image side I.

An optical aperture stop SP may be disposed at the first lens G1 on the image side I. For example, a sheet-like aperture stop SP may be disposed between the first lens G1 and the second lens G2. An optical block G may be included between the fifth lens G5 and an image plane IP. The optical block G may include, for example, an optical filter or a phase plate. Alternatively, an optical member having a plate shape, such as a cover glass or an infrared cut-off filter, may be disposed as the optical block G.

When the photographing lens is used in an imaging optical system, such as an exchangeable lens camera, a monitoring camera, a video camera, or a digital still camera, a cell phone, or other electronic devices having image capturing capabilities, the image plane IP may correspond to an imaging plane of a solid-state imaging device (a photoelectric conversion device), such as a charge-coupled device (CCD) image sensor or a complementary metal-oxide semiconductor (CMOS) image sensor.

When the photographing lens is used in a camera for a silver salt film photographing, the image plane IP may correspond to a film plane.

The first lens G1 may have a positive refractive power. The first lens G1 may have a convex lens surface toward the object side O. In this embodiment, the first lens G1 is a biconvex lens having two convex lens surfaces toward both the object side O and the image side I.

The object side lens surface of the first lens G1 is formed as a convex lens surface so as to condense light incident on the photographing lens, and thus lenses subsequent to the first lens G1 may be made small and a high image forming performance may be secured.

The second lens G2 may have a negative refractive power. The second lens G2 may have a convex lens surface toward the image side I. The second lens G2 may have a meniscus shape. In addition, the second lens G2 does not have an inflection point in the image side lens surface. An inflection point refers to a point in which a refractive power (or a radius of curvature) changes from (+) to (−) or from (−) to (+). The image side lens surface of the second lens G2 is formed as a convex lens surface having no inflection point, and thus an assembly deviation occurring during manufacturing of a lens, for example, the influence of eccentricity that greatly affects performance degradation, may be reduced.

The third lens G3 may have a positive refractive power. The third lens G3 may have a lens surface that is concave toward the image side I. The third lens G3 may have a meniscus shape. The third lens G3 is formed as a meniscus lens having a lens surface that is concave toward the image side I, and thus the third lens G3 may obtain a high image forming performance.

The fourth lens G4 may have a positive refractive power. The fourth lens G4 may have a convex lens surface toward the image side I. The fourth lens G4 may have a meniscus shape. The fourth lens G4 is formed as a meniscus lens having a convex lens surface toward the image side I, and thus the fourth lens G4 may satisfactorily correct aberration up to the periphery of an image.

The fifth lens G5 may have a negative refractive power. The fifth lens G5 may have at least one inflection point at a position other than an intersection point of an optical axis with an image side lens surface. The image side lens surface of the fifth lens G5 may be formed to be concave around the optical axis. The fifth lens G5 may satisfactorily correct aberration in the periphery of the image, and may easily secure an incidence angle characteristic of a light beam that is incident on the image side lens surface.

In addition, in the current embodiment, when focusing is performed from an infinite object distance to a near object distance, all the lenses, including the first lens G1 to the fifth lens G5, are moved to perform the focusing. Although the focusing may be performed by moving some lenses among the first to fifth lenses G1 to G5, all of the first to fifth lenses G1 to G5 may move in order to secure a satisfactory performance and miniaturization of the photographing lens when performing focusing from the infinite object distance to the near object distance.

The photographing lens according to the embodiment may satisfy the following expressions:

$-3.0 < (r21+r22)/(r21-r22) < -1.0$ <Expression 1>

$-10.0 < (r31+r32)/(r31-r32) < -1.5$ <Expression 2> where, "r21" denotes a paraxial radius of curvature of the object side lens surface of the second lens G2, "r22" denotes a paraxial radius of curvature of the image side lens surface of the second lens G2, "r31" denotes a paraxial radius of curvature of the object side lens surface of the third lens G3, and "r32" denotes a paraxial radius of curvature of the image side lens surface of the third lens G3.

Expression 1 limits the paraxial radius of curvature of the object side lens surface and the paraxial radius of curvature of the image side lens surface of the second lens G2. A manufacturing error may be reduced by satisfying Expression 1.

When "(r21+r22)/(r21−r22)" exceeds the upper limit of Expression 1, it is difficult for the image side lens surface of the second lens G2 to maintain a shape in which the image side lens surface does not have an inflection point and has a convex plane, and it is difficult to suppress an assembly deviation that may occur during the manufacturing of the photographing lens.

In addition, when "(r21+r22)/(r21−r22)" exceeds the upper limit of Expression 1, a curvature of the object side lens surface of the second lens G2 may not allow the second lens G2 to maintain its negative refractive power, and it may be difficult to secure performance in the periphery of the image.

When "(r21+r22)/(r21−r22)" is less than the lower limit of Expression 1, a curvature of the image side lens surface of the second lens G2 increases, and a divergence effect is enhanced, and thus it is difficult to secure performance in the periphery of the image.

In addition, when "(r21+r22)/(r21−r22)" is less than the lower limit of Expression 1, with regard to the curvature of the object side lens surface of the second lens G2, the negative refractive power of the second lens G2 is decreased, and a curvature of a lens surface causing the divergence effect is decreased, and thus it may be difficult to correct the Petzval sum.

Expression 2 limits the paraxial radius of curvature of the object side lens surface and the paraxial radius of curvature of the image side lens surface of the third lens G3, which may limit the shape of the third lens G3 that is required to secure a desired optical performance.

When "(r31+r32)/(r31−r32)" exceeds the upper limit of Expression 2, a curvature of the object side lens surface of the third lens G3 increases, while a curvature of the image side lens surface of the third lens G3 decreases. As a result, an incidence angle of a light beam that is incident on the object side lens surface of the third lens G3 increases, and it may be difficult to correct comatic aberration.

When "(r31+r32)/(r31−r32)" is less than the lower limit of Inequality 2, the curvature of the object side lens surface of the third lens G3 decreases, while the curvature of the image side lens surface of the third lens G3 increases. As a result, it may be difficult to correct aberration due to an increase in spherical aberration.

The photographing lens according to the embodiment may satisfy the following expressions.

$-2.0 < (r21+r22)/(r21-r22) < -1.0$ <Expression 1a>

$-8.0 < (r31+r32)/(r31-r32) < -2.3$ <Expression 2a>

In addition, the fifth lens G5 may be a biconcave lens having both lens surfaces concave around the optical axis.

The fifth lens G5 is formed as a biconcave lens so as to disperse the negative refractive power. Thus, an incidence angle characteristic of a light beam that is incident on the image plane IP may be secured not only in the image side lens surface of the fifth lens G5 but also in the object side lens surface thereof, thereby allowing a high image forming performance to be secured in the periphery of the image.

The first to fifth lenses G1 to G5 may satisfy the following expressions:

$0.75 < f1/f < 1.4$ <Expression 3>

$-2.0 < f2/f < -0.7$ <Expression 4>

$1.2 < f3/f < 3.8$ <Expression 5>

$0.4 < f4/f < 1.0$ <Expression 6>

$-0.85 < f5/f < -0.3$ <Expression 7> where, "f1" denotes a focal length of the first lens G1, "f2" denotes a focal length of the second lens G2, "f3" denotes a focal length of the third lens G3, "f4" denotes a focal length of the fourth lens G4, "f5" denotes a focal length of the fifth lens G5, and "f" denotes a focal length of the entire photographing lens.

Expression 3 limits a ratio of the focal length of the first lens G1 to the focal length of the photographing lens. When "f1/f" exceeds the upper limit of Expression 3, the refractive power of the first lens G1 thereby decreases and a diameter of the first lens G1 may be increased, and thus the photographing lens may be increased in size. When "f1/f" is less than the lower limit of Expression 3, the refractive power of the first lens G1 increases, and it may be difficult to correct aberration. Thus, it is difficult to obtain a high performance of the photographing lens.

Expression 4 limits a ratio of the focal length of the second lens G2 to the focal length of the photographing lens. When "f2/f" exceeds the upper limit of Expression 4, the refractive power of the second lens G2 increases, and a divergence effect is excessively enhanced, and thus it may be difficult to correct aberration in the periphery of the image.

When "f2/f" is less than the lower limit of Expression 4, the refractive power of the second lens G2 is decreased and a divergence effect is decreased, and it may be difficult to increase an incidence angle of an off-axis light beam. Thus, it is difficult to achieve the miniaturization of the photographing lens.

Expression 5 limits a ratio of the focal length of the third lens G3 to the focal length of the photographing lens. When "f3/f" exceeds the upper limit of Expression 5, the refractive power of the third lens G3 is decreased, and it is difficult to correct the off-axis light beam diverging from the second lens G2. Thus, it may be difficult to correct aberration in the periphery of the image.

When "f3/f" is less than the lower limit of Expression 5, the refractive power of the third lens G3 is enhanced, and a convergence effect is excessively enhanced. Thus, the length of the entire optical system is required to be increased in order to secure a desired height of an image, thereby making it difficult to achieve the miniaturization of the photographing lens.

Expression 6 limits a ratio of the focal length of the fourth lens G4 to the focal length of the photographing lens. When "f4/f" exceeds the upper limit of Expression 6, the refractive power of the fourth lens G4 is decreased, and a light beam may not sufficiently converge on the fourth lens G4. Thus, it may be difficult to secure an incidence angle characteristic of the light beam that is incident on the image plane IP in the fifth lens G5.

When "f4/f" is less than the lower limit of Expression 6, the refractive power of the fourth lens G4 is enhanced, and a convergence effect is excessively enhanced. Thus, it may be difficult to correct astigmatic aberration or the like.

Expression 7 limits a ratio of the focal length of the fifth lens G5 to the focal length of the photographing lens.

When "f5/f" exceeds the upper limit of Expression 7, the refractive power of the fifth lens G5 is enhanced, and a divergence effect is excessively enhanced. Thus, it may be difficult to secure an incidence angle characteristic with respect to the image plane IP.

When "f5/f" is less than the lower limit of Expression 7, the refractive power of the fifth lens G5 is decreased, and a divergence effect is decreased. Thus, it may be difficult to correct astigmatic aberration around the center of the image.

For example, the first to fifth lenses G1 to G5 may satisfy the following expressions.

$0.80 < f1/f < 1.1$                                           <Expression 3a>

$-1.7 < f2/f < -1.0$                              <Expression 4a>

$1.5 < f3/f < 3.3$                                         <Expression 5a>

$0.5 < f4/f < 0.8$                                         <Expression 6a>

$-0.65 < f5/f < -0.4$                         <Expression 7a>

Furthermore, the first lens G1, the third lens G3, the fourth lens G4, and the fifth lens G5 may be formed of the same material. For example, the first to fifth lens G1 to G5 may satisfy the following expressions:

$vd1345 > 50.0$                                          <Expression 8>

$vd2 < 25.0$                                             <Expression 9> where, "vd1345" denotes an Abbe's number with respect to a d-line of the first lens G1, the third lens G3, the fourth lens G4, and the fifth lens G5, and "vd2" denotes an Abbe's number with respect to a d-line of the second lens G2.

The first lens G1, the third lens G3, the fourth lens G4, and the fifth lens G5 may be formed of the same material, for example, glass or resin, so as to satisfactorily correct chromatic aberration and to secure a high image forming performance.

For example, all of the first to fifth lenses G1 to G5 may be formed of plastic and the first lens G1, the third lens G3, the fourth lens G4, and the fifth lens G5 may be formed of the same plastic material. This way, a change in refractive index and a change in shape due to a change in temperature may be offset in each lens, thereby reducing performance degradation.

Expression 8 limits the Abbe's number of each of the first lens G1, the third lens G3, the fourth lens G4, and the fifth lens G5.

When "vd1345" is less than the lower limit of Expression 8, it may be difficult to correct axial chromatic aberration and chromatic difference of magnification.

Expression 9 limits the Abbe's number of the second lens G2.

When "vd2" exceeds the upper limit of Expression 9, a divergence effect of the second lens G2 is not sufficiently performed, and thus it may be difficult to correct axial chromatic aberration and chromatic difference of magnification.

For example, the first to fifth lenses may satisfy the following expressions.

$vd1345 > 53.0$                                         <Expression 8a>

$vd2 < 23.0$                                            <Expression 9a>

The photographing lens according to the embodiment may satisfy the following expressions:

$D34t < D3t$                                          <Expression 10>

$1.0 < (r41+r42)/(r41-r42) < 3.0$      <Expression 11>

$-0.8 < (r51+r52)/(r51-r52) < 3.0$    <Expression 12> where, "D34t" denotes an air-gap on the optical axis between the third lens G3 and the fourth lens G4, "D3t" denotes a thickness of the third lens G3 on the optical axis, "r41" denotes a paraxial radius of curvature of the object side lens surface of the fourth lens G4, "r42" denotes a paraxial radius of curvature of the image side lens surface of the fourth lens G4, "r51" denotes a paraxial radius of curvature of the object side lens surface of the fifth lens G5, and "r52" denotes a paraxial radius of curvature of the image side lens surface of the fifth lens G5.

Expression 10 is an expression for the miniaturization of the photographing lens, and limits a relationship between the air-gap on the optical axis between the third lens G3 and the fourth lens G4 and the thickness of the third lens G3 on the optical axis.

When "D34t" exceeds "D3t" of Expression 10, the air-gap on the optical axis between the third lens G3 and the fourth lens G4 thereby increases, and the total thickness of the forming photographing lens on the optical axis increases. Thus, it is difficult to achieve the miniaturization of the photographing lens.

Expression 11 limits the paraxial radius of curvature of the object side lens surface and the paraxial radius of curvature of the image side lens surface of the fourth lens G4.

For example, the photographing lens according to the embodiment may satisfy the following expressions.

$$1.15 < (r41+r42)/(r41-r42) < 2.5 \qquad \langle \text{Expression 11a} \rangle$$

$$-0.5 < (r51+r52)/(r51-r52) < 1.5 \qquad \langle \text{Expression 12a} \rangle$$

According to the embodiment, the photographing lens may be realized by five lenses, having a small F number Fno, being small in size, and having a high image forming performance by appropriately configuring the shapes and curvatures of the lenses.

Hereinafter, first to eighth embodiments of the invention will be described.

Table 1 shows that the embodiments satisfy the above-mentioned expressions.

TABLE 1

| Expr. | First Em. | Second Em. | Third Em. | Fourth Em. | Fifth Em. | Sixth Em. | Seventh Em. | Eighth Em. |
|---|---|---|---|---|---|---|---|---|
| (1) | −1.085 | −1.986 | −1.013 | −1.015 | −1.022 | −1.020 | −1.021 | −1.019 |
| (2) | −5.392 | −3.465 | −6.056 | −3.175 | −8.000 | −5.188 | −6.181 | −2.269 |
| (3) | 0.909 | 0.929 | 1.078 | 0.800 | 0.890 | 0.891 | 0.909 | 0.858 |
| (4) | −1.295 | −1.560 | −1.647 | −0.903 | −1.348 | −1.213 | −1.272 | −1.180 |
| (5) | 2.246 | 2.013 | 2.295 | 1.500 | 3.259 | 2.064 | 2.491 | 1.536 |
| (6) | 0.616 | 0.547 | 0.609 | 0.739 | 0.617 | 0.580 | 0.794 | 0.655 |
| (7) | −0.484 | −0.406 | −0.503 | −0.553 | −0.504 | −0.444 | −0.650 | −0.482 |
| (11) | 1.285 | 1.156 | 1.220 | 1.789 | 1.196 | 1.159 | 1.464 | 2.459 |
| (12) | 0.952 | 0.801 | 0.999 | 0.670 | 0.962 | −0.534 | 1.500 | 1.000 |

When "(r41+r42)/(r41−r42)" exceeds the upper limit of Expression 11, the object side lens surface of the fourth lens G4 has a large curvature, while the image side lens surface of the fourth lens G4 has a small curvature. As a result, an incidence angle of a light beam that is incident on the object side lens surface of the fifth lens G5 excessively decreases, and the total length of the photographing lens is required to be increased when securing a desired height of an image. Thus, it is difficult to achieve the miniaturization of the photographing lens.

When "(r41+r42)/(r41−r42)" is less than the lower limit of Inequality 11, the sign of the curvature of the object side lens surface of the fourth lens G4 is changed, and thus the fourth lens G4 may become a biconvex lens. In addition, a convergence effect is excessively enhanced, and thus spherical aberration increases, and it becomes difficult to correct aberration.

Expression 12 limits the paraxial radius of curvature of the object side lens surface and the paraxial radius of curvature of the image side lens surface of the fifth lens G5.

When "(r51+r52)/(r51−r52)" exceeds the upper limit of Expression 12, the sign of the curvature of the object side lens surface of the fifth lens G5 is changed, and thus the fifth lens G5 may have a convex shape. In addition, the negative refractive power of the fifth lens G5 may not diverge, and thus a load on the curvature of the image side lens surface of the fifth lens G5 increases. Accordingly, eccentricity sensitivity increases, which results in a great performance degradation due to a manufacturing deviation.

When "(r51+r52)/(r51−r52)" is less than the lower limit of Expression 12, the curvature of the object side lens surface of the fifth lens G5 increases, while the curvature of the image side lens surface thereof decreases. As a result, it may be difficult to secure an incidence angle characteristic of a light beam to be incident on the image side lens surface of the fifth lens G5.

In each embodiment, a surface number i denotes the order of lens surfaces from the object side O to the image side I. Here, "ri" denotes a radius of curvature of an i-th optical lens surface, "di" denotes an interval between the i-th plane and an (i+1)-th plane or a lens thickness, and "ndi" and "vdi" respectively denote a refractive index and an Abbe's number of an i-th optical member with respect to the d-line.

A back focus BF is a value obtained by an air conversion of a distance from a final lens surface to a paraxial image plane. The total length of the photographing lens is a value obtained by adding the back focus BF to a distance from the object side lens surface of the first lens G1 up to the final lens surface, that is, up to the image side lens surface of the fifth lens G5.

A unit of length is mm.

In addition, "K" is a conic constant, and "A4", "A6", "A8", "A10", and "A12" denote aspherical coefficients. In addition, when the displacement in an optical axis direction at a height h from the optical axis is "x" based on a lens surface vertex, an aspherical shape is defined as follows:

$$X = \frac{h^2/R}{1+\sqrt{1-(1+K)h^2/R^2}} + \sum A_i h^i \qquad \langle \text{Expression 13} \rangle$$

where, "R" denotes a radius of curvature. In addition, the indication of "E-Z" means "$10^{-Z}$", "f" denotes a focal length, "Fno" denotes an F number, and "ω" denotes a half angle of view.

(First Embodiment)

Figure 2:
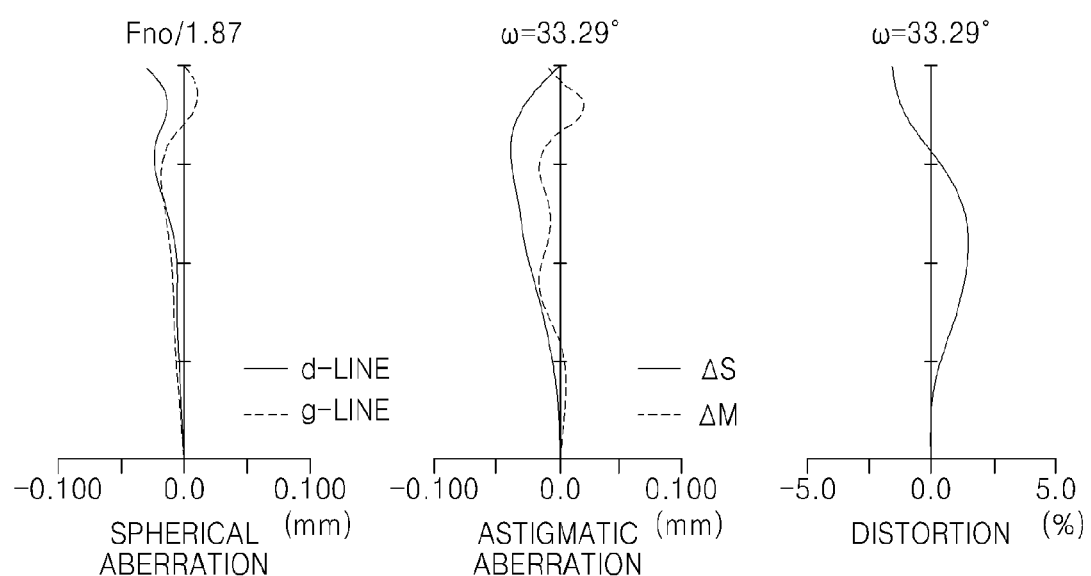
FIG. 2 is an aberration diagram of the photographing lens of FIG. 1.

Table 2 shows the lens data of a photographing lens according to a first embodiment. FIG. 1 illustrates the photographing lens of the first embodiment. FIG. 2 illustrates an aberration diagram of the photographing lens of the first embodiment.

TABLE 2

| Surface Number | r | d | nd | vd |
|---|---|---|---|---|
| Object Plane | ∞ | ∞ | | |
| 1* | 4.100 | 1.540 | 1.53113 | 55.75 |
| 2* | −27.740 | 0.000 | | |
| 3 (SP) | ∞ | 0.451 | | |
| 4* | −6.112 | 0.600 | 1.65055 | 21.53 |
| 5* | −150 | 0.596 | | |
| 6* | 3.342 | 0.830 | 1.53113 | 55.75 |
| 7* | 4.864 | 0.825 | | |
| 8* | −17.773 | 1.400 | 1.53113 | 55.75 |
| 9* | −2.220 | 0.578 | | |
| 10* | −80.323 | 0.600 | 1.53113 | 55.75 |
| 11* | 1.988 | 0.580 | | |
| 12 | ∞ | 0.300 | 1.51680 | 64.20 |
| 13 | ∞ | 1.200 | | |
| Image Plane | ∞ | | | |

Table 3 shows aspherical data of the photographing lens of the first embodiment.

TABLE 3

Lens surface 1

K = 0    A4 = −1.453E−03  A6 = −6.60E−04   A8 = 1.490E−04   A10 = −4.930E−05

Lens surface 2

K = 0    A4 = −3.742E−03  A6 = −6.400E−04  A8 = −4.103E−04  A10 = 5.289E−05

Lens surface 4

K = 0    A4 = 5.932E−03   A6 = −8.339E−04  A8 = −5.829E−04  A10 = 1.183E−04

Lens surface 5

K = 0    A4 = −2.380E−03  A6 = 1.889E−03   A8 = −5.921E−04  A10 = 6.452E−05

Lens surface 6

K = 0    A4 = −1.770E−02  A6 = 8.480E−04   A8 = −1.080E−04  A10 = −4.340E−06

Lens surface 7

K = 0    A4 = −2.625E−03  A6 = −2.520E−03  A8 = 3.209E−04   A10 = −3.026E−05

Lens surface 8

K = 0    A4 = 8.875E−03   A6 = −1.569E−03  A8 = −1.122E−04  A10 = −5.645E−06

Lens surface 9

K = −6.040E+00  A4 = −8.283E−03  A6 = 3.113E−03   A8 = −7.163E−04  A10 = 4.476E−05

Lens surface 10

K = 6.600E−05   A4 = −2.730E−02  A6 = 2.464E−03   A8 = −3.368E−04  A10 = 1.687E−05

Lens surface 11

K = −6.731E+00  A4 = −1.562E−02  A6 = 1.476E−03   A8 = −1.220E−04  A10 = 4.887E−06   A12 = −7.650E−08

Table 4 shows various design data of the photographing lens of the first embodiment.

TABLE 4

| | |
|---|---|
| Focal Length | 7.501 |
| F number | 1.87 |
| Half Angle of View(°) | 33.29 |
| Height of Image | 4.840 |
| Total Length of Photographing Lens | 9.500 |
| BF | 1.978 |

FIG. 2 includes diagrams illustrating spherical aberration, astigmatic aberration, and distortion of the photographing lens according to the first embodiment. In the astigmatic aberration diagram, astigmatic aberration of a meridional image plane ΔM and astigmatic aberration of a sagittal image plane ΔS are illustrated. Hereinafter, each embodiment is shown with such an aberration diagram.

(Second Embodiment)

Figure 3:
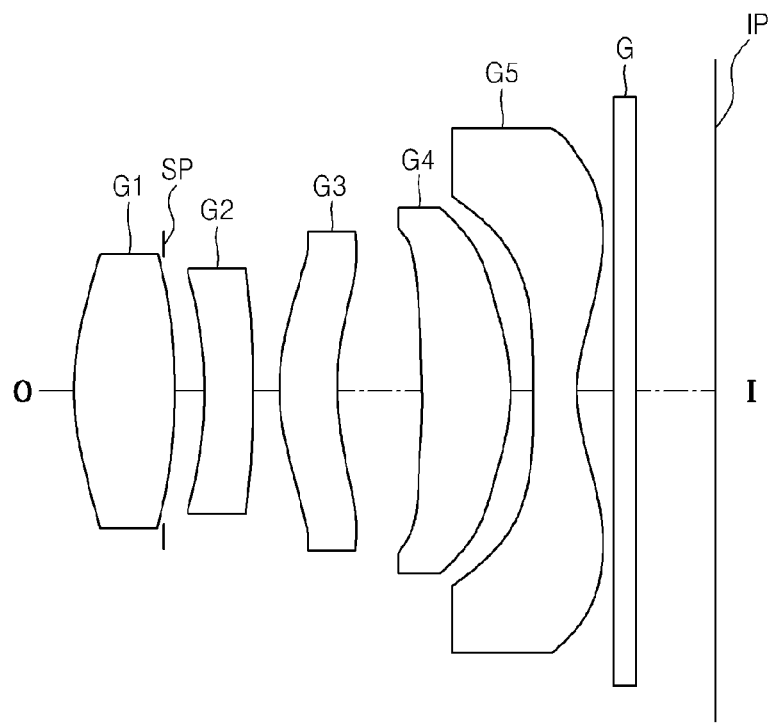
FIG. 3 is a diagram illustrating a photographing lens, according to a second embodiment.
Figure 4:
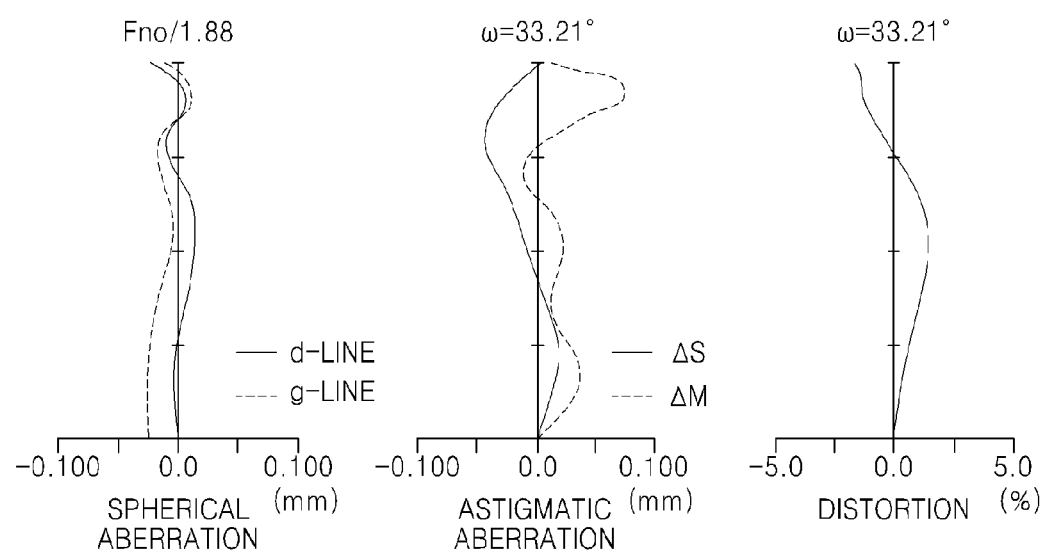
FIG. 4 is an aberration diagram of the photographing lens of FIG. 3.

Table 5 shows the lens data of a photographing lens according to a second embodiment. FIG. 3 illustrates the photographing lens of the second embodiment. FIG. 4 illustrates an aberration diagram of the photographing lens of the second embodiment.

TABLE 5

| Surface Number | r | d | nd | vd |
|---|---|---|---|---|
| Object Plane | ∞ | ∞ | | |
| 1* | 3.944 | 1.340 | 1.53113 | 55.75 |
| 2* | −57.261 | 0.000 | | |
| 3 (SP) | ∞ | 0.628 | | |
| 4* | −5.039 | 0.600 | 1.65055 | 21.53 |
| 5* | −15.262 | 0.785 | | |
| 6* | 3.954 | 0.880 | 1.53113 | 55.75 |

TABLE 5-continued

| Surface Number | r | d | nd | vd |
|---|---|---|---|---|
| 7* | 7.162 | 0.830 | | |
| 8* | −28.546 | 1.390 | 1.53113 | 55.75 |
| 9* | −2.069 | 0.307 | | |
| 10* | −16.537 | 0.600 | 1.53113 | 55.75 |
| 11* | 1.827 | 0.588 | | |
| 12 | ∞ | 0.300 | 1.51680 | 64.20 |
| 13 | ∞ | 1.200 | | |
| Image Plane | ∞ | | | |

Table 6 shows aspherical data of the photographing lens of the second embodiment.

TABLE 6

| Lens surface 1 | |
|---|---|
| K = 0 | A4 = −1.049E−03  A6 = −7.837E−04  A8 = 2.337E−04  A10 = −6.700E−05 |

| Lens surface 2 | |
|---|---|
| K = 0 | A4 = −4.193E−03  A6 = −5.698E−05  A8 = −4.050E−04  A10 = 3.217E−05 |

| Lens surface 4 | |
|---|---|
| K = 0 | A4 = 1.942E−03  A6 = 2.537E−04  A8 = −4.834E−04  A10 = 8.472E−05 |

| Lens surface 5 | |
|---|---|
| K = 0 | A4 = −1.563E−03  A6 = 5.521E−04  A8 = −1.190E−04  A10 = 1.388E−05 |

| Lens surface 6 | |
|---|---|
| K = 0 | A4 = −6.483E−03  A6 = −8.276E−04  A8 = 1.728E−04  A10 = −2.291E−05 |

| Lens surface 7 | |
|---|---|
| K = 0 | A4 = 5.281E−03  A6 = −2.974E−03  A8 = 3.122E−04  A10 = −2.674E−05 |

| Lens surface 8 | |
|---|---|
| K = 0 | A4 = 1.238E−02  A6 = −2.145E−03  A8 = −1.827E−04  A10 = −5.236E−05 |

| Lens surface 9 | |
|---|---|
| K = −8.418E+00 | A4 = −1.852E−03  A6 = 4.205E−03  A8 = −8.505E−04  A10 = 4.091E−05 |

| Lens surface 10 | |
|---|---|
| K = 1.288E−01 | A4 = −1.715E−02  A6 = 1.599E−03  A8 = −1.710E−04  A10 = 8.109E−06 |

| Lens surface 11 | |
|---|---|
| K = −8.018E+00 | A4 = −1.319E−02  A6 = 1.234E−03  A8 = −1.202E−04  A10 = 6.662E−06  A12 = −1.466E−07 |

Table 7 shows various design data of the photographing lens of the second embodiment.

TABLE 7

| | |
|---|---|
| Focal Length | 7.505 |
| F number | 1.88 |
| Half Angle of View(°) | 33.21 |
| Height of Image | 4.840 |
| Total Length of Photographing Lens | 9.448 |
| BF | 1.985 |

(Third Embodiment)

Figure 5:
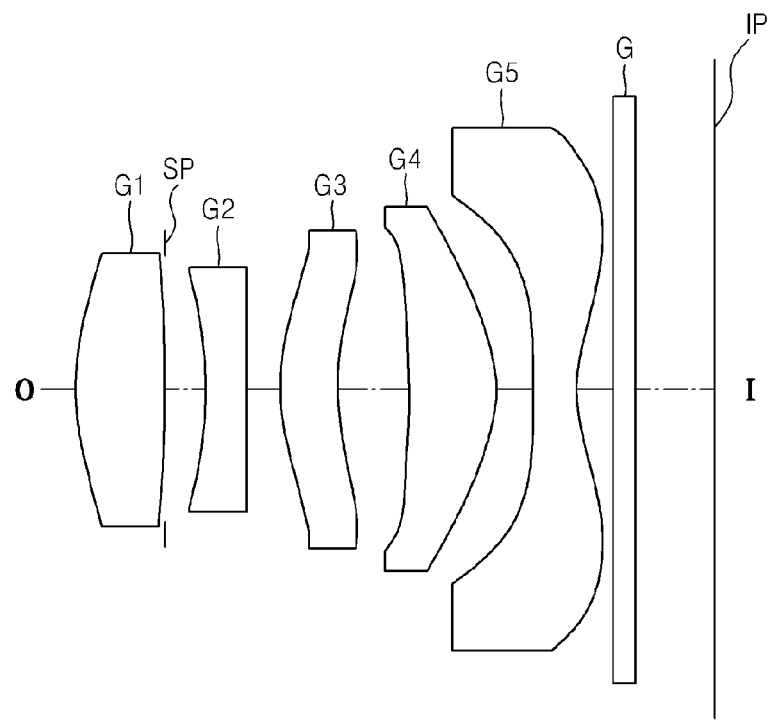
FIG. 5 is a diagram illustrating a photographing lens, according to a third embodiment.
Figure 6:
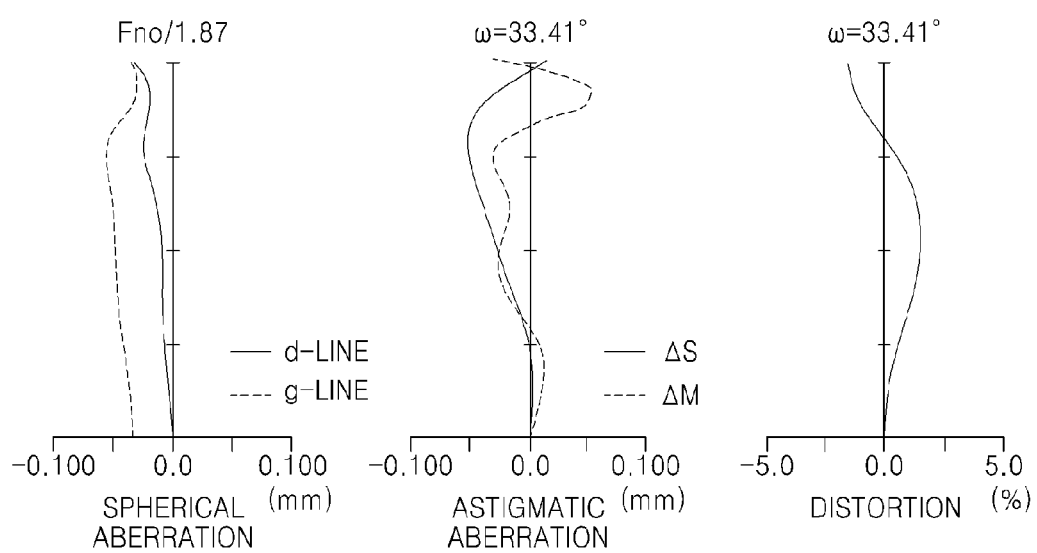
FIG. 6 is an aberration diagram of the photographing lens of FIG. 5.

Table 8 shows the lens data of a photographing lens according to a third embodiment. FIG. 5 illustrates the photographing lens of the third embodiment. FIG. 6 illustrates an aberration diagram of the photographing lens of the third embodiment.

TABLE 8

| Surface Number | r | d | nd | vd |
|---|---|---|---|---|
| Object Plane | ∞ | ∞ | | |
| 1* | 3.948 | 1.380 | 1.53113 | 55.75 |
| 2* | −43.458 | 0.000 | | |
| 3 (SP) | ∞ | 0.624 | | |
| 4* | −8.030 | 0.600 | 1.65055 | 21.53 |
| 5* | −1243 | 0.473 | | |
| 6* | 3.195 | 0.850 | 1.53113 | 55.75 |
| 7* | 4.459 | 0.830 | | |
| 8* | −22.569 | 1.450 | 1.53113 | 55.75 |
| 9* | −2.239 | 0.584 | | |
| 10* | −6020 | 0.600 | 1.53113 | 55.75 |
| 11* | 2.004 | 0.599 | | |
| 12 | ∞ | 0.300 | 1.51680 | 64.20 |
| 13 | ∞ | 1.210 | | |
| Image Plane | ∞ | | | |

Table 9 shows aspherical data of the photographing lens of the third embodiment.

TABLE 9

| Lens surface 1 | |
|---|---|
| K = 0 | A4 = −1.140E−03  A6 = −7.118E−04  A8 = 1.553E−04  A10 = −4.575E−05 |

| Lens surface 2 | |
|---|---|
| K = 0 | A4 = −3.511E−03  A6 = −5.492E−04  A8 = −4.195E−04  A10 = 4.670E−05 |

| Lens surface 4 | |
|---|---|
| K = 0 | A4 = 5.297E−03  A6 = −1.027E−03  A8 = −5.919E−04  A10 = 1.173E−04 |

| Lens surface 5 | |
|---|---|
| K = 0 | A4 = −2.201E−03  A6 = 1.701E−03  A8 = −5.891E−04  A10 = 6.948E−05 |

| Lens surface 6 | |
|---|---|
| K = 0 | A4 = −1.781E−02  A6 = −8.162E−04  A8 = −9.089E−05  A10 = −4.138E−06 |

| Lens surface 7 | |
|---|---|
| K = 0 | A4 = −2.229E−03  A6 = −2.592E−03  A8 = 3.439E−04  A10 = −2.957E−05 |

TABLE 9-continued

| Lens surface 8 |
| --- |

| K = 0 | A4 = 9.519E−03 | A6 = −1.379E−03 | A8 = −1.232E−04 | A10 = −1.887E−06 |
| --- | --- | --- | --- | --- |

| Lens surface 9 |
| --- |

| K = −6.041E+00 | A4 = −7.977E−03 | A6 = 3.356E−03 | A8 = −7.410E−04 | A10 = 4.621E−05 |
| --- | --- | --- | --- | --- |

| Lens surface 10 |
| --- |

| K = 3.712E−08 | A4 = −2.614E−02 | A6 = 2.507E−03 | A8 = −3.551E−04 | A10 = 1.988E−05 |
| --- | --- | --- | --- | --- |

| Lens surface 11 |
| --- |

| K = −6.420E+00 | A4 = −1.561E−02 | A6 = 1.475E−03 | A8 = −1.185E−04 | A10 = 4.732E−06 | A12 = −7.376E−08 |
| --- | --- | --- | --- | --- | --- |

Table 10 shows various design data of the photographing lens of the third embodiment.

TABLE 10

| | |
| --- | --- |
| Focal Length | 7.462 |
| F number | 1.87 |
| Half Angle of View(°) | 33.41 |
| Height of Image | 4.840 |
| Total Length of Photographing Lens | 9.500 |
| BF | 2.007 |

(Fourth Embodiment)

Figure 7:
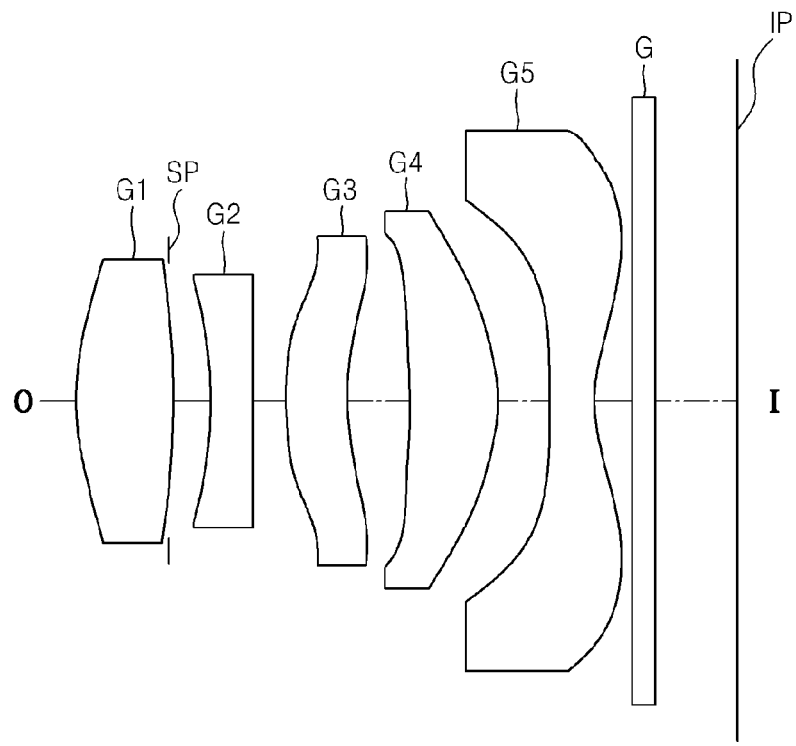
FIG. 7 is a diagram illustrating a photographing lens, according to a fourth embodiment.
Figure 8:
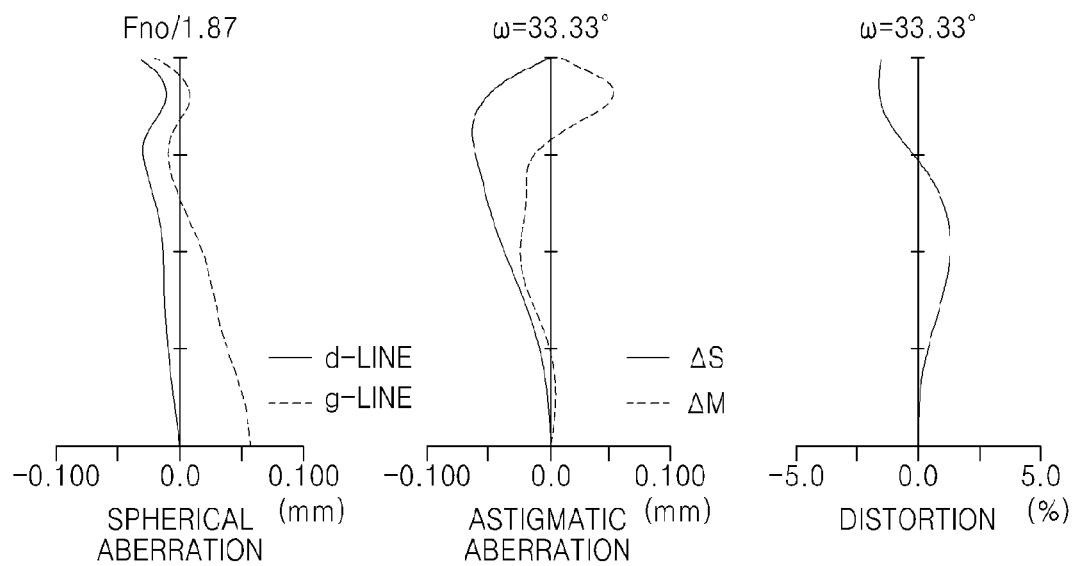
FIG. 8 is an aberration diagram of the photographing lens of FIG. 7.

Table 11 shows the lens data of a photographing lens according to a fourth embodiment. FIG. 7 illustrates the photographing lens of the fourth embodiment. FIG. 8 illustrates an aberration diagram of the photographing lens of the fourth embodiment.

TABLE 11

| Surface Number | r | d | nd | vd |
| --- | --- | --- | --- | --- |
| Object Plane | ∞ | ∞ | | |
| 1* | 4.044 | 1.420 | 1.53113 | 55.75 |
| 2* | −13.351 | 0.000 | | |
| 3 (SP) | ∞ | 0.475 | | |
| 4* | −4.408 | 0.800 | 1.65055 | 21.53 |
| 5* | −600 | 0.383 | | |
| 6* | 3.177 | 0.900 | 1.53113 | 55.75 |
| 7* | 6.097 | 0.766 | | |
| 8* | −8.082 | 1.330 | 1.53113 | 55.75 |
| 9* | −2.286 | 0.862 | | |
| 10* | −13.571 | 0.600 | 1.53113 | 55.75 |
| 11* | 2.680 | 0.465 | | |
| 12 | ∞ | 0.300 | 1.51680 | 64.20 |
| 13 | ∞ | 1.200 | | |
| Image Plane | ∞ | | | |

Table 12 shows aspherical data of the photographing lens of the fourth embodiment.

TABLE 12

| Lens surface 1 |
| --- |

| K = 0 | A4 = −1.264E−03 | A6 = −7.988E−04 | A8 = 2.421E−04 | A10 = −7.125E−05 |
| --- | --- | --- | --- | --- |

| Lens surface 2 |
| --- |

| K = 0 | A4 = 7.279E−04 | A6 = −2.766E−04 | A8 = −5.515E−04 | A10 = 5.349E−05 |
| --- | --- | --- | --- | --- |

| Lens surface 4 |
| --- |

| K = 0 | A4 = 1.948E−02 | A6 = −3.047E−03 | A8 = −2.295E−04 | A10 = 8.354E−05 |
| --- | --- | --- | --- | --- |

| Lens surface 5 |
| --- |

| K = 0 | A4 = −4.074E−03 | A6 = 2.949E−03 | A8 = −8.972E−04 | A10 = 9.648E−05 |
| --- | --- | --- | --- | --- |

| Lens surface 6 |
| --- |

| K = 0 | A4 = −2.699E−02 | A6 = −1.905E−03 | A8 = −4.917E−04 | A10 = 2.488E−05 |
| --- | --- | --- | --- | --- |

| Lens surface 7 |
| --- |

| K = 0 | A4 = 2.184E−03 | A6 = −4.146E−03 | A8 = 4.164E−04 | A10 = −3.940E−05 |
| --- | --- | --- | --- | --- |

| Lens surface 8 |
| --- |

| K = 0 | A4 = 9.694E−03 | A6 = −1.003E−03 | A8 = −2.442E−04 | A10 = −4.098E−06 |
| --- | --- | --- | --- | --- |

| Lens surface 9 |
| --- |

| K = −4.893E+00 | A4 = −1.335E−02 | A6 = 3.652E−03 | A8 = −7.289E−04 | A10 = 4.310E−05 |
| --- | --- | --- | --- | --- |

| Lens surface 10 |
| --- |

| K = −5.136E−02 | A4 = −2.374E−02 | A6 = 1.666E−03 | A8 = −2.193E−04 | A10 = 9.092E−07 |
| --- | --- | --- | --- | --- |

| Lens surface 11 |
| --- |

| K = −8.965E+00 | A4 = −1.523E−02 | A6 = 1.367E−03 | A8 = −1.257E−04 | A10 = 4.994E−06 | A12 = −7.206E−08 |
| --- | --- | --- | --- | --- | --- |

Table 13 shows various design data of the photographing lens of the fourth embodiment.

TABLE 13

| | |
|---|---|
| Focal Length | 7.486 |
| F number | 1.87 |
| Half Angle of View(°) | 33.33 |
| Height of Image | 4.840 |
| Total Length of Photographing Lens | 9.500 |
| BF | 1.862 |

(Fifth Embodiment)

Figure 9:
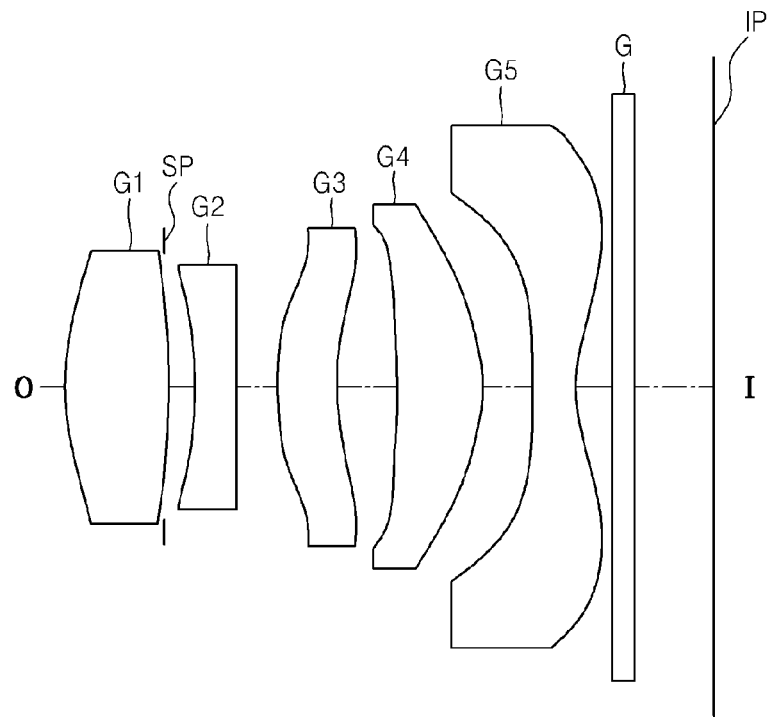
FIG. 9 is a diagram illustrating a photographing lens, according to a fifth embodiment.
Figure 10:
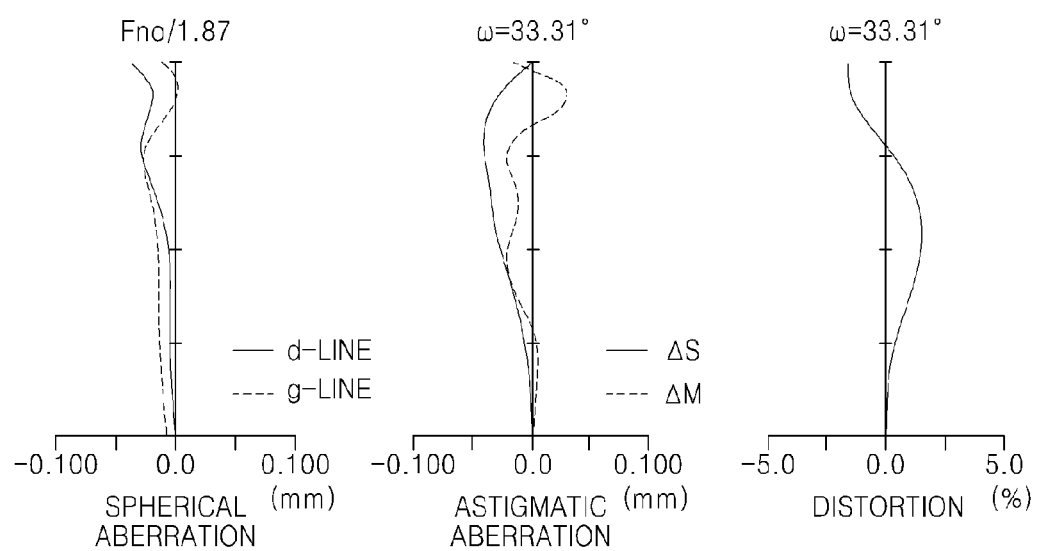
FIG. 10 is an aberration diagram of the photographing lens of FIG. 9.

Table 14 shows the lens data of a photographing lens according to a fifth embodiment. FIG. 9 illustrates the photographing lens of the fifth embodiment. FIG. 10 illustrates an aberration diagram of the photographing lens of the fifth embodiment.

TABLE 14

| Surface Number | r | d | nd | vd |
|---|---|---|---|---|
| Object Plane | ∞ | ∞ | | |
| 1* | 4.070 | 1.550 | 1.53113 | 55.75 |
| 2* | −24.314 | 0.000 | | |
| 3(SP) | ∞ | 0.444 | | |
| 4* | −6.563 | 0.600 | 1.65055 | 21.53 |
| 5* | −600 | 0.620 | | |
| 6* | 3.654 | 0.790 | 1.53113 | 55.75 |
| 7* | 4.698 | 0.693 | | |
| 8* | −25.676 | 1.470 | 1.53113 | 55.75 |
| 9* | −2.294 | 0.652 | | |
| 10* | −107.285 | 0.600 | 1.53113 | 55.75 |
| 11* | 2.057 | 0.581 | | |
| 12 | ∞ | 0.300 | 1.51680 | 64.20 |
| 13 | ∞ | 1.200 | | |
| Image Plane | ∞ | | | |

Table 15 shows aspherical data of the photographing lens of the fifth embodiment.

TABLE 15

| Lens surface 1 |
|---|
| K = 0    A4 = −1.366E−03  A6 = −6.384E−04  A8 = 1.608E−04   A10 = −5.272E−05 |
| Lens surface 2 |
| K = 0    A4 = −3.655E−03  A6 = −5.715E−04  A8 = −4.131E−04  A10 = 5.144E−05 |
| Lens surface 4 |
| K = 0    A4 = 4.826E−03   A6 = −8.496E−04  A8 = −5.772E−04  A10 = 1.218E−04 |
| Lens surface 5 |
| K = 0    A4 = −1.689E−03  A6 = 1.579E−03   A8 = −5.909E−04  A10 = 7.184E−05 |
| Lens surface 6 |
| K = 0    A4 = −1.816E−02  A6 = 6.623E−04   A8 = −7.566E−05  A10 = −7.125E−06 |
| Lens surface 7 |
| K = 0    A4 = −4.732E−03  A6 = −2.556E−03  A8 = 3.243E−04   A10 = −3.192E−05 |
| Lens surface 8 |
| K = 0    A4 = 9.497E−03   A6 = −1.639E−03  A8 = −1.331E−04  A10 = −1.866E−06 |
| Lens surface 9 |
| K = −5.975E+00  A4 = −8.912E−03  A6 = 3.280E−03   A8 = −7.437E−04  A10 = 4.725E−05 |
| Lens surface 10 |
| K = 1.549E−04   A4 = −2.677E−02  A6 = 2.463E−03   A8 = −3.603E−04  A10 = 1.855E−05 |
| Lens surface 11 |
| K = −6.569E+00  A4 = −1.522E−02  A6 = 1.412E−03   A8 = −1.186E−04  A10 = 4.749E−06   A12 = −7.443E−08 |

Table 16 shows various design data of the photographing lens of the fifth embodiment.

TABLE 16

| | |
|---|---|
| Focal Length | 7.489 |
| F number | 1.87 |
| Half Angle of View(°) | 33.31 |
| Height of Image | 4.840 |
| Total Length of Photographing Lens | 9.500 |
| BF | 1.979 |

(Sixth Embodiment)

Figure 11:
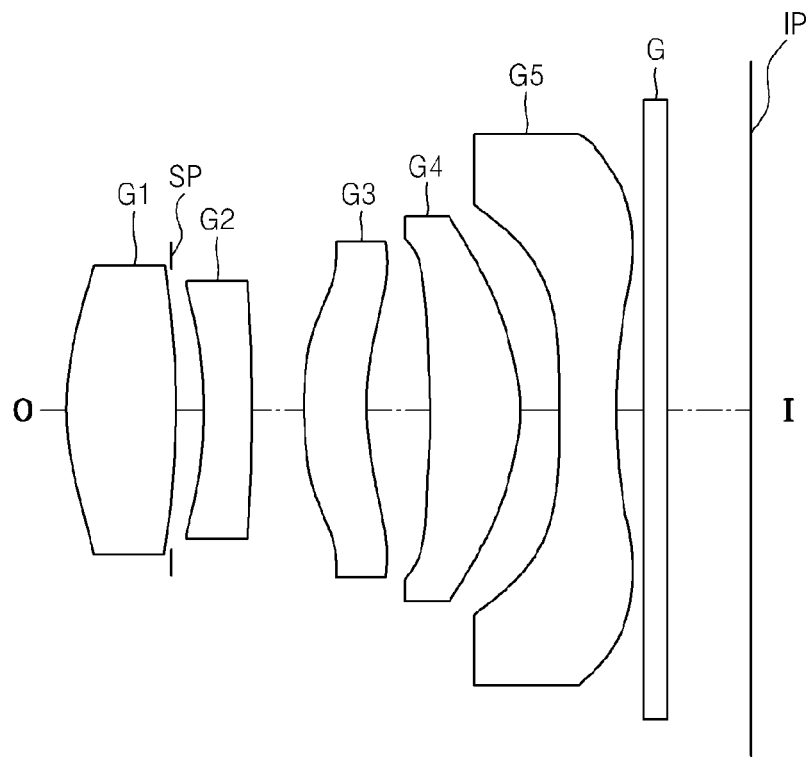
FIG. 11 is a diagram illustrating a photographing lens, according to a sixth embodiment.
Figure 12:
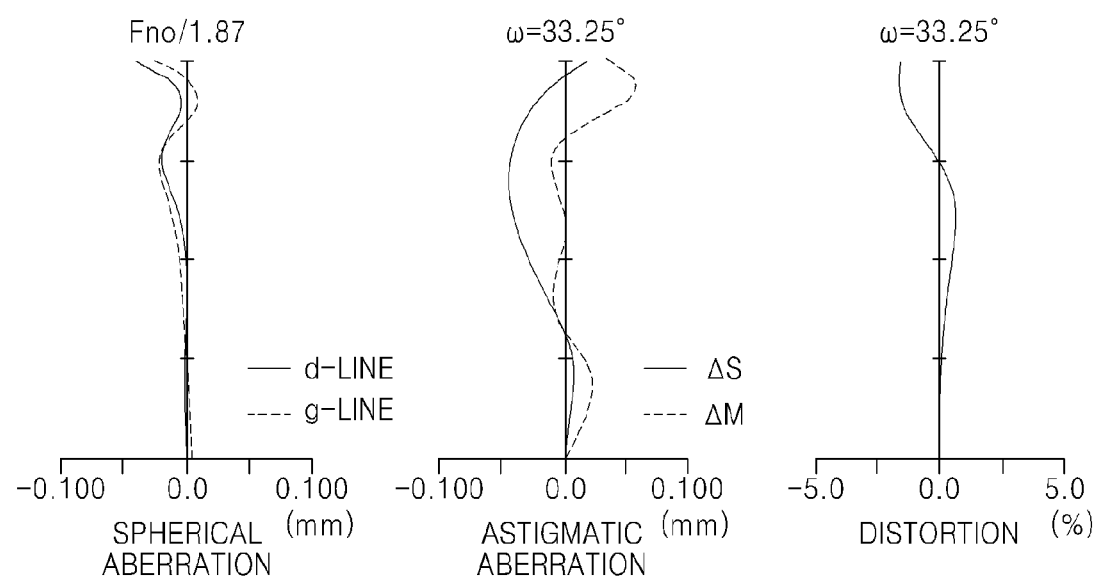
FIG. 12 is an aberration diagram of the photographing lens of FIG. 11.

Table 17 shows the lens data of a photographing lens according to a sixth embodiment. FIG. 11 illustrates the photographing lens of the sixth embodiment. FIG. 12 illustrates an aberration diagram of the photographing lens of the sixth embodiment.

TABLE 17

| Surface Number | r | d | nd | vd |
|---|---|---|---|---|
| Object Plane | ∞ | ∞ | | |
| 1* | 4.171 | 1.560 | 1.53113 | 55.75 |
| 2* | −21.305 | 0.000 | | |
| 3(SP) | ∞ | 0.452 | | |
| 4* | −5.920 | 0.600 | 1.65055 | 21.53 |
| 5* | −600 | 0.587 | | |
| 6* | 3.176 | 0.830 | 1.53113 | 55.75 |
| 7* | 4.693 | 0.800 | | |
| 8* | −29.682 | 1.480 | 1.53113 | 55.75 |
| 9* | −2.188 | 0.777 | | |
| 10* | −2.362 | 0.600 | 1.53113 | 55.75 |
| 11* | 7.787 | 0.313 | | |
| 12 | ∞ | 0.300 | 1.51680 | 64.20 |
| 13 | ∞ | 1.200 | | |
| Image Plane | ∞ | | | |

Table 18 shows aspherical data of the photographing lens of the sixth embodiment.

TABLE 18

| | Lens surface 1 | | | |
|---|---|---|---|---|
| K = 0 | A4 = −1.375E−03 | A6 = −6.011E−04 | A8 = 1.447E−04 | A10 = −4.706E−05 |

| | Lens surface 2 | | | |
|---|---|---|---|---|
| K = 0 | A4 = −2.173E−03 | A6 = −5.832E−04 | A8 = −4.442E−04 | A10 = 5.117E−05 |

| | Lens surface 4 | | | |
|---|---|---|---|---|
| K = 0 | A4 = 7.991E−03 | A6 = −9.641E−04 | A8 = −6.472E−04 | A10 = 1.141E−04 |

| | Lens surface 5 | | | |
|---|---|---|---|---|
| K = 0 | A4 = −2.810E−03 | A6 = 2.123E−03 | A8 = −6.564E−04 | A10 = 6.648E−05 |

| | Lens surface 6 | | | |
|---|---|---|---|---|
| K = 0 | A4 = −1.865E−02 | A6 = 9.913E−04 | A8 = −1.235E−04 | A10 = −1.869E−08 |

| | Lens surface 7 | | | |
|---|---|---|---|---|
| K = 0 | A4 = −3.072E−03 | A6 = −2.242E−03 | A8 = 2.795E−04 | A10 = −2.850E−05 |

| | Lens surface 8 | | | |
|---|---|---|---|---|
| K = 0 | A4 = 4.275E−04 | A6 = 3.206E−04 | A8 = −1.842E−04 | A10 = −1.070E−05 |

| | Lens surface 9 | | | |
|---|---|---|---|---|
| K = −4.789E+00 | A4 = −1.432E−02 | A6 = 4.780E−03 | A8 = −7.789E−04 | A10 = 4.104E−05 |

| | Lens surface 10 | | | |
|---|---|---|---|---|
| K = −6.210E+00 | A4 = −1.045E−02 | A6 = 6.585E−04 | A8 = −2.012E−04 | A10 = 2.408E−06 |

| | Lens surface 11 | | | | |
|---|---|---|---|---|---|
| K = 6.878E−01 | A4 = −1.158E−02 | A6 = 8.186E−04 | A8 = −8.380E−05 | A10 = 3.277E−06 | A12 = −4.327E−08 |

Table 19 shows various design data of the photographing lens of the sixth embodiment.

TABLE 19

| Focal Length | 7.498 |
|---|---|
| F number | 1.87 |
| Half Angle of View(°) | 33.25 |
| Height of Image | 4.840 |
| Total Length of Photographing Lens | 9.500 |
| BF | 1.711 |

(Seventh Embodiment)

Figure 13:
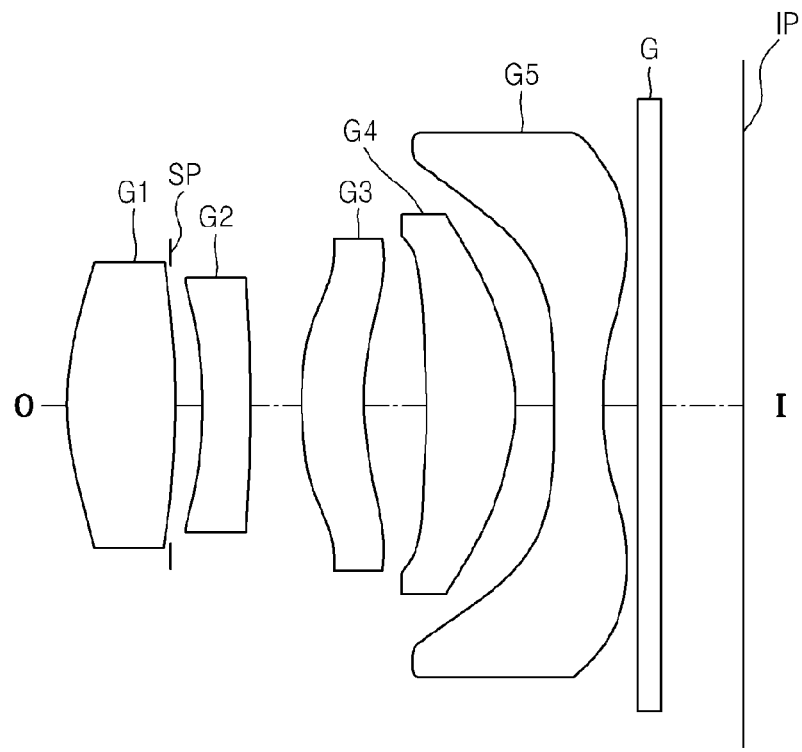
FIG. 13 is a diagram illustrating a photographing lens, according to a seventh embodiment.
Figure 14:
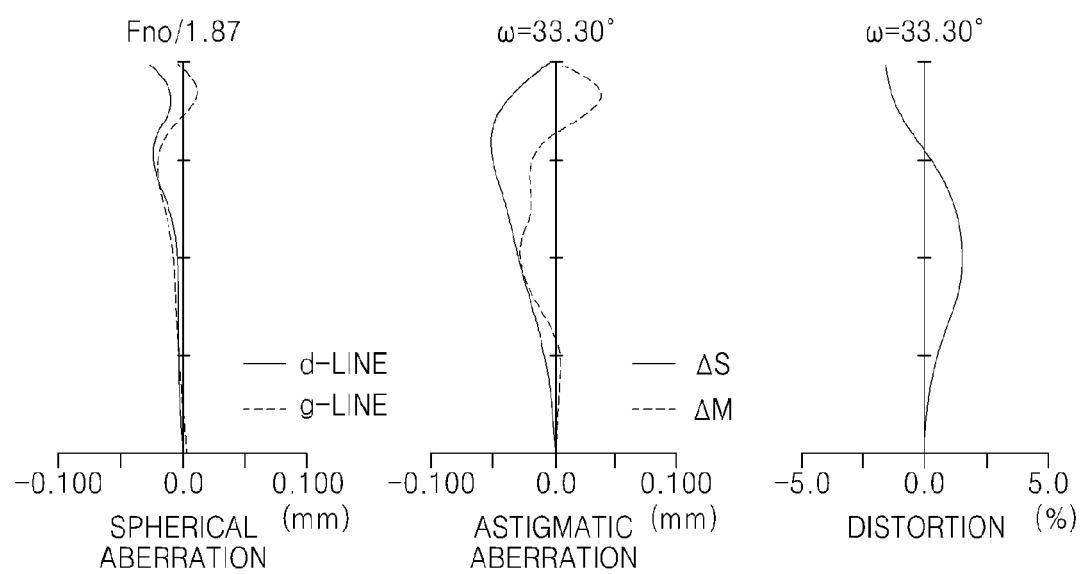
FIG. 14 is an aberration diagram of the photographing lens of FIG. 13.

Table 20 shows the lens data of a photographing lens according to a seventh embodiment. FIG. 13 illustrates the photographing lens of the seventh embodiment. FIG. 14 illustrates an aberration diagram of the photographing lens of the seventh embodiment.

TABLE 20

| Surface Number | r | d | nd | vd |
|---|---|---|---|---|
| Object Plane | ∞ | ∞ | | |
| 1* | 4.018 | 1.470 | 1.53113 | 55.75 |
| 2* | −33.061 | 0.000 | | |
| 3(SP) | ∞ | 0.449 | | |
| 4* | −6.201 | 0.600 | 1.65055 | 21.53 |
| 5* | −600 | 0.522 | | |
| 6* | 3.342 | 0.760 | 1.53113 | 55.75 |
| 7* | 4.632 | 0.758 | | |
| 8* | −14.237 | 1.350 | 1.53113 | 55.75 |
| 9* | −2.679 | 0.773 | | |
| 10* | −10.069 | 0.720 | 1.53113 | 55.75 |
| 11* | 2.014 | 0.597 | | |
| 12 | ∞ | 0.300 | 1.51680 | 64.20 |
| 13 | ∞ | 1.200 | | |
| Image Plane | ∞ | | | |

Table 21 shows aspherical data of the photographing lens of the seventh embodiment.

TABLE 21

| | Lens surface 1 | | | |
|---|---|---|---|---|
| K = 0 | A4 = −1.272E−03 | A6 = −7.019E−04 | A8 = 1.878E−04 | A10 = −5.717E−05 |

| | Lens surface 2 | | | |
|---|---|---|---|---|
| K = 0 | A4 = −3.252E−03 | A6 = −4.515E−04 | A8 = −4.744E−04 | A10 = 5.558E−05 |

| | Lens surface 4 | | | |
|---|---|---|---|---|
| K = 0 | A4 = 7.435E−03 | A6 = −1.082E−03 | A8 = −5.694E−04 | A10 = 1.180E−04 |

| | Lens surface 5 | | | |
|---|---|---|---|---|
| K = 0 | A4 = −2.464E−03 | A6 = 1.917E−03 | A8 = −6.218E−04 | A10 = 6.967E−05 |

| | Lens surface 6 | | | |
|---|---|---|---|---|
| K = 0 | A4 = −2.085E−02 | A6 = 4.616E−04 | A8 = −1.069E−04 | A10 = −3.290E−06 |

| | Lens surface 7 | | | |
|---|---|---|---|---|
| K = 0 | A4 = −2.841E−03 | A6 = −3.601E−03 | A8 = 4.934E−04 | A10 = −4.589E−05 |

TABLE 21-continued

| Lens surface 8 | | | | |
|---|---|---|---|---|
| K = 0 | A4 = 9.911E−03 | A6 = −2.785E−03 | A8 = 1.435E−04 | A10 = −2.111E−05 |

| Lens surface 9 | | | | |
|---|---|---|---|---|
| K = −6.629E+00 | A4 = −1.420E−02 | A6 = 3.086E−03 | A8 = −5.942E−04 | A10 = 4.071E−05 |

| Lens surface 10 | | | | |
|---|---|---|---|---|
| K = 1.094E−02 | A4 = −4.281E−02 | A6 = 4.368E−03 | A8 = −3.384E−04 | A10 = 1.178E−05 |

| Lens surface 11 | | | | | |
|---|---|---|---|---|---|
| K = −5.183E+00 | A4 = −2.005E−02 | A6 = 2.258E−03 | A8 = −1.871E−04 | A10 = 7.971E−06 | A12 = −1.408E−07 |

Table 22 shows various design data of the photographing lens of the seventh embodiment.

TABLE 22

| Focal Length | 7.493 |
|---|---|
| F number | 1.87 |
| Half Angle of View(°) | 33.30 |
| Height of Image | 4.840 |
| Total Length of Photographing Lens | 9.500 |
| BF | 1.995 |

(Eighth Embodiment)

Figure 15:
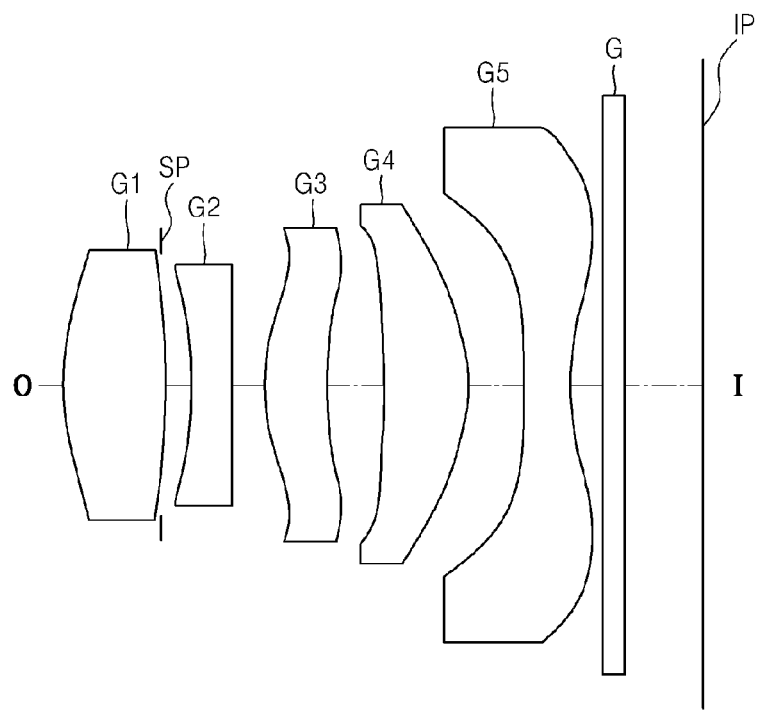
FIG. 15 is a diagram illustrating a photographing lens, according to an eighth embodiment.
Figure 16:
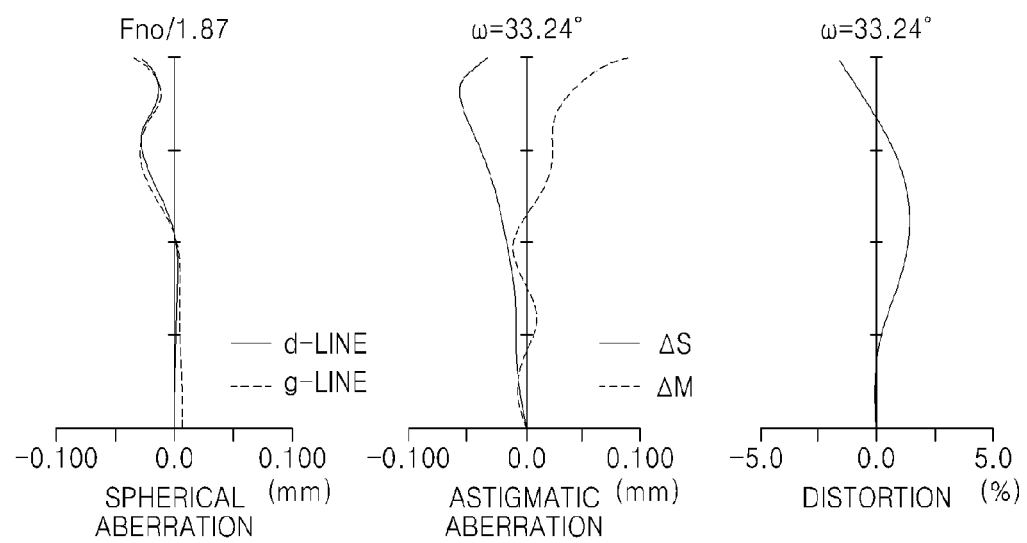
FIG. 16 is an aberration diagram of the photographing lens of FIG. 15.

Table 23 shows the lens data of a photographing lens according to an eighth embodiment. FIG. 15 illustrates the photographing lens of the eighth embodiment. FIG. 16 illustrates an aberration diagram of the photographing lens of the eighth embodiment.

TABLE 23

| Surface Number | r | d | nd | vd |
|---|---|---|---|---|
| Object Plane | ∞ | ∞ | | |
| 1* | 4.033 | 1.470 | 1.53113 | 55.75 |
| 2* | −20.091 | 0.000 | | |
| 3(SP) | ∞ | 0.470 | | |
| 4* | −5.764 | 0.600 | 1.65055 | 21.53 |
| 5* | −600 | 0.574 | | |
| 6* | 3.949 | 0.890 | 1.53113 | 55.75 |
| 7* | 10.172 | 0.834 | | |
| 8* | −4.247 | 1.280 | 1.53113 | 55.75 |
| 9* | −1.791 | 0.576 | | |
| 10* | −11755 | 0.700 | 1.53113 | 55.75 |
| 11* | 1.927 | 0.604 | | |
| 12 | ∞ | 0.300 | 1.51680 | 64.20 |
| 13 | ∞ | 1.200 | | |
| Image Plane | ∞ | | | |

Table 24 shows aspherical data of the photographing lens of the eighth embodiment.

TABLE 24

| Lens surface 1 | | | | |
|---|---|---|---|---|
| K = 0 | A4 = −1.814E−03 | A6 = −6.805E−04 | A8 = 1.399E−04 | A10 = −6.015E−05 |

| Lens surface 2 | | | | |
|---|---|---|---|---|
| K = 0 | A4 = −2.928E−03 | A6 = −6.194E−04 | A8 = −4.257E−04 | A10 = 4.884E−05 |

| Lens surface 4 | | | | |
|---|---|---|---|---|
| K = 0 | A4 = 7.982E−03 | A6 = −6.497E−04 | A8 = −5.815E−04 | A10 = 1.134E−04 |

| Lens surface 5 | | | | |
|---|---|---|---|---|
| K = 0 | A4 = −3.242E−03 | A6 = 1.933E−03 | A8 = −5.643E−04 | A10 = 5.448E−05 |

| Lens surface 6 | | | | |
|---|---|---|---|---|
| K = 0 | A4 = −1.864E−02 | A6 = 4.787E−04 | A8 = −1.642E−04 | A10 = −1.401E−05 |

| Lens surface 7 | | | | |
|---|---|---|---|---|
| K = 0 | A4 = 2.786E−04 | A6 = −2.883E−03 | A8 = 2.854E−04 | A10 = −3.719E−05 |

| Lens surface 8 | | | | |
|---|---|---|---|---|
| K = 0 | A4 = 1.222E−02 | A6 = −1.449E−03 | A8 = −1.396E−04 | A10 = −1.283E−06 |

| Lens surface 9 | | | | |
|---|---|---|---|---|
| K = −3.817E+00 | A4 = −1.194E−02 | A6 = 3.362E−03 | A8 = −7.116E−04 | A10 = 4.989E−05 |

| Lens surface 10 | | | | |
|---|---|---|---|---|
| K = −5.674E−09 | A4 = −2.367E−02 | A6 = 2.369E−03 | A8 = −3.634E−04 | A10 = 2.046E−05 |

| Lens surface 11 | | | | | |
|---|---|---|---|---|---|
| K = −6.846E+00 | A4 = −1.380E−02 | A6 = 1.253E−03 | A8 = −1.115E−04 | A10 = 5.128E−06 | A12 = −9.891E−08 |

Table 25 shows various design data of the photographing lens of the eighth embodiment.

TABLE 25

| Focal Length | 7.502 |
|---|---|
| F number | 1.88 |
| Half Angle of View(°) | 33.24 |
| Height of Image | 4.840 |
| Total Length of Photographing Lens | 9.498 |
| BF | 2.002 |

As described above, the photographing lens according to the various embodiments includes five lenses, has a small Fno, is made small in size, and has a high image forming performance by appropriately configuring the shapes and curvatures of the lenses. The photographing lens according to the various embodiments may be employed in, for example, a video camera, a digital still camera, a mobile phone with a camera, a PDA, or any electronic device having image capturing capabilities.

Figure 17:
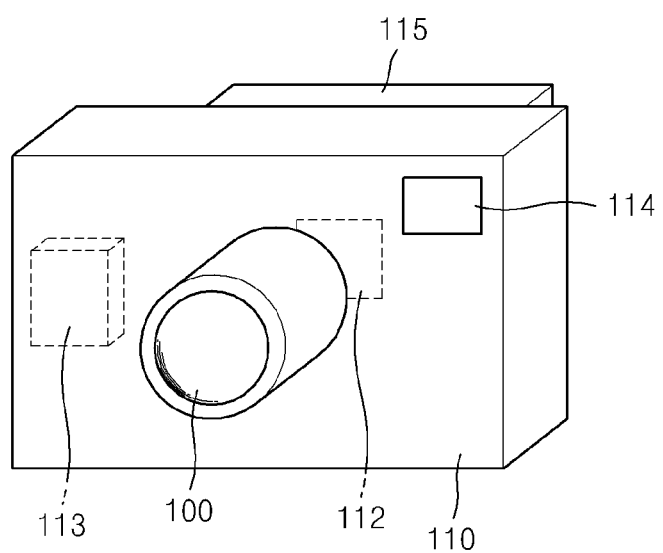
FIG. 17 is a diagram illustrating a photographing device including a photographing lens according to various embodiments.

FIG. 17 illustrates an example of an electronic device including the photographing lens according to the various embodiments. The photographing device includes a photographing lens 100, and an imaging element 112 that converts an optical image formed by the photographing lens 100 into an electrical image signal. The photographing lens 100 is as described above with reference to FIGS. 1 to 16. The photographing device includes a housing 110 to which the photographing lens 100 is detachable coupled as an exchangeable lens, and the imaging element 112 is disposed in the housing 110. The photographing device may include a storage unit 113 that records information corresponding to a subject image formed by photoelectric conversion from the imaging element 112, and a viewfinder 114 for observing the subject image. In addition, the photographing device may include a display unit 115 on which the subject image is displayed. Herein, an example is shown where the viewfinder 114 and the display unit 115 are separately included. However, only the display unit 115 may be included without the viewfinder 114. The photographing device illustrated in FIG. 17 is just an example, and the invention is not limited thereto. The photographing lens according to various embodiments may be employed in a camera, a mobile optical device, a cell phone, or any electronic device having image capturing capabilities. A photographing device that is made small, has high luminance, and is capable of high performance imaging may be realized by applying the photographing lens according to various embodiments to an electronic device such as a digital camera.

It should be understood that the exemplary embodiments described therein should be considered in a descriptive sense only and not for purposes of limitation. Descriptions of features or aspects within each embodiment should typically be considered as available for other similar features or aspects in other embodiments.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While one or more embodiments of the invention have been described with reference to the figures, it will be understood by those of ordinary skill in the art that various changes in form and details may be made therein without departing from the spirit and scope of the invention as defined by the following claims.

What is claimed is:

1. A photographing lens comprising, sequentially from an object side to an image side:
    a first lens having a positive refractive power;
    a second lens having a negative refractive power and an image side lens surface that is convex toward the image side;
    a third lens having a positive refractive power;
    a fourth lens having a positive refractive power; and
    a fifth lens having a negative refractive power and an image side lens surface that is concave toward the image side around an optical axis,
    wherein the photographing lens satisfies the following expressions:

$1.0 < (r41 + r42)/(r41 - r42) < 3.0$, and $-0.8 < (r51 + r52)/(r51 - r52) < 3.0$, where, "r41" denotes a paraxial radius of curvature of the object side lens surface of the fourth lens, "r42" denotes a paraxial radius of curvature of the image side lens surface of the fourth lens, "r51" denotes a paraxial radius of curvature of the object side lens surface of the fifth lens, and "r52" denotes a paraxial radius of curvature of the image side lens surface of the fifth lens.

2. The photographing lens of claim 1, wherein the first lens and the second lens satisfy the following expressions:

$$0.75 < f1/f < 1.4, \text{ and}$$

$$-2.0 < f2/f < -0.7,$$

where, "f" denotes a focal length of the photographing lens, "f1" denotes a focal length of the first lens, and "f2" denotes a focal length of the second lens.

3. The photographing lens of claim 1, wherein the third lens and the fourth lens satisfy the following expressions:

$$1.2 < f3/f < 3.8, \text{ and}$$

$$0.4 < f4/f < 1.0,$$

where, "f" denotes a focal length of the photographing lens, "f3" denotes a focal length of the third lens, and "f4" denotes a focal length of the fourth lens.

4. The photographing lens of claim 1, wherein the fifth lens satisfies the following expression:

$$-0.85 < f5/f < -0.3,$$

where, "f" denotes a focal length of the photographing lens, and "f5" denotes a focal length of the fifth lens.

5. The photographing lens of claim 4, wherein the fifth lens has a biconcave shape around the optical axis.

6. The photographing lens of claim 1, wherein the image side lens surface of the second lens has no inflection point.

7. The photographing lens of claim 1, wherein the image side lens surface of the fifth lens has at least one inflection point that is not an intersection point of the fifth lens and the optical axis.

8. The photographing lens of claim 1, wherein the first lens, the third lens, the fourth lens, and the fifth lens are formed of the same material.

9. The photographing lens of claim 1, wherein the photographing lens satisfies the following expression:

$$vd1345 > 50.0,$$

where, "vd1345" denotes an Abbe's number with respect to a d-line of the first lens, the third lens, the fourth lens, and the fifth lens.

10. The photographing lens of claim 1, wherein the photographing lens satisfies the following expression:

$$vd2 < 25.0,$$

where, "vd2" denotes an Abbe's number with respect to a d-line of the second lens.

11. The photographing lens of claim 1, wherein the photographing lens satisfies the following expression:

$$D34t < D3t,$$

where, "D34t" denotes an air-gap on the optical axis between the third lens and the fourth lens, and "D3t" denotes a thickness of the third lens on the optical axis.

12. The photographing lens of claim 1, wherein the third lens has a meniscus shape being concave toward the image side.

13. The photographing lens of claim 1, wherein the fourth lens has a meniscus shape being convex toward the image side.

14. An electronic device comprising:
a photographing lens; and
an imaging element that receives an optical image formed by the photographing lens and converts the optical image into an electrical image signal, wherein the photographing lens comprises, sequentially from an object side to an image side,
a first lens having a positive power,
a second lens having a negative refractive power and an image side lens surface that is convex toward the image side,
a third lens having a positive refractive power,
a fourth lens having a positive refractive power, and
a fifth lens having a negative refractive power and an image side lens surface that is concave toward the image side around an optical axis, and wherein the photographing lens satisfies the following expressions:

$$1.0 < (r41+r42)/(r41-r42) < 3.0, \text{ and}$$

$$-0.8 < (r51+r52)/(r51-r52) < 3.0$$

where, "r41" denotes a paraxial radius of curvature of the object side lens surface of the fourth lens, "r42" denotes a paraxial radius of curvature of the image side lens surface of the fourth lens, "r51" denotes a paraxial radius of curvature of the object side lens surface of the fifth lens, and "r52" denotes a paraxial radius of curvature of the image side lens surface of the fifth lens.

15. The electronic device of claim 14, wherein the first lens and the second lens satisfy the following expressions:

$$0.75 < f1/f < 1.4, \text{ and}$$

$$-2.0 < f2/f < -0.7,$$

where, "f" denotes a focal length of the photographing lens, "f1" denotes a focal length of the first lens, and "f2" denotes a focal length of the second lens.

16. The electronic device of claim 14, wherein the second lens has an image side lens surface that is convex toward the image side.

17. The electronic device of claim 14, wherein the third lens has a meniscus shape being concave toward the image side.

18. The electronic device of claim 14, wherein the third lens and the fourth lens satisfy the following expressions:

$$1.2 < f3/f < 3.8, \text{ and}$$

$$0.4 < f4/f < 1.0,$$

where, "f" denotes a focal length of the photographing lens, "f3" denotes a focal length of the third lens, and "f4" denotes a focal length of the fourth lens.

19. A photographing lens comprising, sequentially from an object side to an image side:
a first lens having a positive refractive power;
a second lens having a negative refractive power;
a meniscus third lens having a positive refractive power and an image side lens surface that is concave toward the image side;
a fourth lens having a positive refractive power; and
a fifth lens having a negative refractive power and an image side lens surface that is concave toward the image side around an optical axis, wherein the photographing lens satisfies the following expressions:

$$1.0 < (r41+r42)/(r41-r42) < 3.0,$$

$$-0.8 < (r51+r52)/(r51-r52) < 3.0, \text{ and}$$

$$D34t < D3t,$$

where, "r41" denotes a paraxial radius of curvature of the object side lens surface of the fourth lens, "r42" denotes a paraxial radius of curvature of the image side lens surface of the fourth lens, "r51" denotes a paraxial radius of curvature of the object side lens surface of the fifth lens, "r52" denotes a paraxial radius of curvature of the image side lens surface of the fifth lens, "D34t" denotes an air-gap on the optical axis between the third lens and the fourth lens, and "D3t" denotes a thickness of the third lens on the optical axis.

20. The photographing lens of claim 19, wherein the third lens and the fourth lens satisfy the following expressions:

$1.2 < f3/f < 3.8$, and $0.4 < f4/f < 1.0$, where, "f" denotes a focal length of the photographing lens, "f3" denotes a focal length of the third lens, and "f4" denotes a focal length of the fourth lens.

\* \* \* \* \*